No. 865,782. PATENTED SEPT. 10, 1907.
C. JACKSON.
INK WELL.
APPLICATION FILED JAN. 21, 1907.
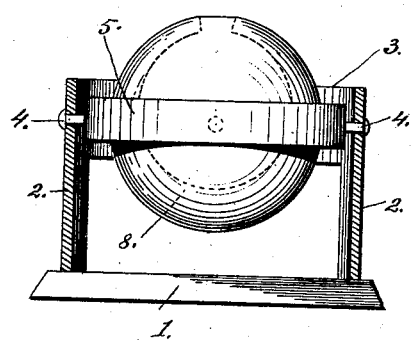
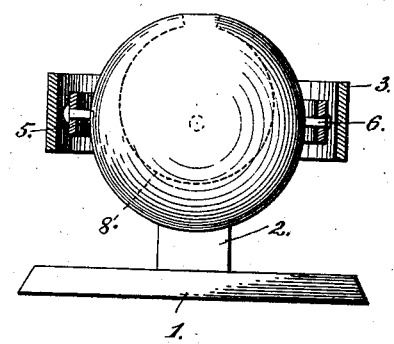
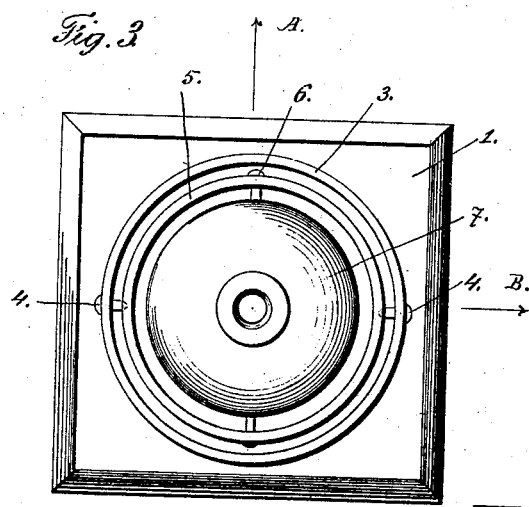
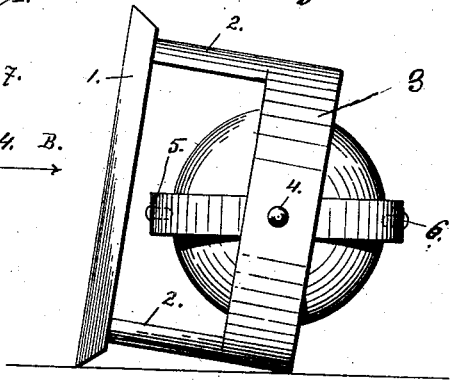
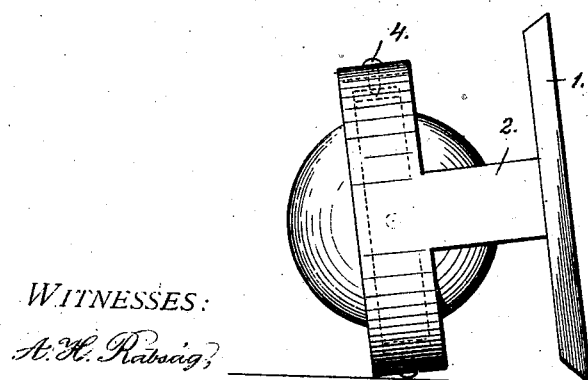
WITNESSES:
INVENTOR
Charles Jackson
BY
Attorneys

UNITED STATES PATENT OFFICE.

CHARLES JACKSON, OF PITTSBURG, PENNSYLVANIA.

INK-WELL.

No. 865,782.  Specification of Letters Patent.  Patented Sept. 10, 1907.

Application filed January 21, 1907. Serial No. 353,337.

*To all whom it may concern:*

Be it known that I, CHARLES JACKSON, a citizen of the United States of America, residing at Pittsburg, in the county of Allegheny and State of Pennsylvania, have invented certain new and useful Improvements in Ink-Wells, of which the following is a specification, reference being had therein to the accompanying drawing.

This invention relates to ink wells, and the invention has for its object to provide a novel ink well or stand, wherein positive and reliable means are employed for maintaining the ink or writing fluid receptacle in an upright position whereby ink will not be spilled when the stand or well is tilted or upset.

Briefly described, my improved ink well or stand comprises a suitable base carrying a ring or annulus in which are revolubly mounted two rings or bands, the innermost ring or band pivotally supporting an ink or fluid receptacle, which owing to the novel manner in which the rings or bands are mounted, is maintained in an upright position irrespective of the position of its supporting stand.

The detail construction entering into the invention will be presently described and then specifically pointed out in the appended claims, and referring to the drawing forming part of this specification, like numerals of reference designate corresponding parts throughout the several views, in which:—

Figure 1 is a vertical sectional view of my improved ink well or stand partly in side elevation, Fig. 2 is a cross sectional view of the same, Fig. 3 is a plan of the ink well or stand, and Figs. 4 and 5 are elevations of the ink well or stand tilted in the directions of the arrows A and B of Fig. 3.

The ink well comprises a rectangular base 1 having two diametrically opposed standards 2 terminating in a ring or annulus 3.

Pivotally mounted in the annulus or ring 3 by pins or screws 4 is a band or ring 5 of less width than the width of the annulus, and pivotally mounted in the band or ring 5 by pins or screws 6 is an ink receptacle 7 having a weighted bottom 8. The receptacle 7 is pivotally mounted in the band or ring 5 at right angles to the pivot points of the band or ring 5 within the ring or annulus 3, whereby the band or ring 5 can easily tilt in opposite directions to the ink receptacle 7.

By forming the band or ring of less width than the width of the annulus and positioning it midway of the width of said annulus, said band or ring, when the ink well is in its proper position, will have its upper edge located some distance below the plane of the annulus, so that there is practically no liability of accidentally striking the ring and tilting the well.

In Figs. 4 and 5 of the drawing, I have illustrated two positions that can be readily assumed by the receptacle 7, when the ink stand or well is accidentally tilted.

As shown, the pivot pins for the band or ring 5 are located midway between the supporting standards 2, the pivot pins for the ink well being located at right angles thereto. Hence, when the well is upset to the position shown in Fig. 5, the slight resiliency of the metal of the annulus will prevent the placing of a direct and violent shock on the pivot pins of the ink-well, this resiliency permitting a slight relative movement of the annulus and the pivot pins between it and the band or ring, while when the structure is upset to the position shown in Fig. 4, the annulus is supported by the standards and the pivot pins, not being located directly in the line of shock, will be protected to an extent which would practically prevent injury to the parts. In either case the liability of injury to the well and its pivot pins is practically eliminated.

From the novel construction of the stand, it will be observed that it is impossible for the contents of the receptacle to be upset, as the weighted bottom 8 of said receptacle normally maintains the same in an upright position. The ink well is preferably constructed of light and durable metal and may be suitably ornamented or embossed according to the esthetic taste.

It is obvious that the ink well may be made of any desired size, and such changes in the details of construction as are permissible by the appended claims, may be resorted to without departing from the scope of the invention.

Having thus described my invention, what I claim as new is:

1. In an ink well, a supporting base, two opposing standards extending vertically from opposite sides of the base, an annulus integral with the upper ends of said standards, a suspension ring pivotally mounted in said annulus, the pivot points being substantially midway the standards, and an ink receptacle pivotally mounted in said ring, the pivot points for the receptacle being at right angles to the pivot points of the ring.

2. In an ink well, two concentrically arranged rings, the outer of which is provided with integral supporting standards, the inner ring being pivotally mounted in the outer ring, and an ink receptacle pivotally mounted in said inner ring, the inner ring being of less width than the width of the outer ring.

3. In an ink well, a supporting base, two oppositely disposed standards rising from the base, an annulus integral with the upper ends of said standards, a suspension ring pivotally secured at opposite sides to the said annulus, said ring being of less width than the width of the annulus, a substantially spherical ink receptacle pivotally supported from opposite sides of its periphery from said ring, the pivot points of the ring and well being on the same horizontal plane, the respective pivot pins being located at right angles to each other, the ink receptacle having a weighted bottom for normally maintaining the receptacle with its opening uppermost, and said ink receptacle pivoted in a horizontal line at right angles to the line of pivot for the ring.

In testimony whereof I affix my signature in the presence of two witnesses.

CHARLES JACKSON.

Witnesses:
  MAX H. SROLOVITZ,
  F. O. MCCLEARY.